(12) United States Patent
Parham et al.

(10) Patent No.: US 7,499,413 B2
(45) Date of Patent: Mar. 3, 2009

(54) METHOD FOR DESIGNATING COMMUNICATION PATHS IN A NETWORK

(75) Inventors: Jeffrey B. Parham, Redmond, WA (US); Mark R. Brown, Seattle, WA (US); William B. Lees, Redmond, WA (US); Van H. Vu, Bellevue, WA (US); Laszlo Lovasz, Sammamish, WA (US); Nicholas J. A. Harvey, Redmond, WA (US); Katalin Vesztergombi, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 540 days.

(21) Appl. No.: 11/043,607

(22) Filed: Jan. 26, 2005

(65) Prior Publication Data

US 2005/0256879 A1 Nov. 17, 2005

Related U.S. Application Data

(63) Continuation of application No. 09/795,202, filed on Feb. 28, 2001, now Pat. No. 6,879,564.

(51) Int. Cl.
*H04L 12/28* (2006.01)
(52) U.S. Cl. ........................ 370/256; 709/241
(58) Field of Classification Search ........................ None
See application file for complete search history.

(56) References Cited

U.S. PATENT DOCUMENTS

| | | | |
|---|---|---|---|
| 4,864,559 A * | 9/1989 | Perlman | ...................... 370/256 |
| 4,873,517 A | 10/1989 | Baratz et al. | |
| 5,261,051 A | 11/1993 | Masden et al. | |
| 5,291,477 A * | 3/1994 | Liew | ........................... 370/238 |
| 5,313,630 A | 5/1994 | Namioka et al. | |
| 5,551,027 A | 8/1996 | Choy et al. | |
| 5,588,147 A | 12/1996 | Neeman et al. | |
| 5,608,903 A | 3/1997 | Prasad et al. | |
| 5,649,194 A | 7/1997 | Miller et al. | |
| 5,675,787 A | 10/1997 | Miller et al. | |
| 5,698,121 A | 12/1997 | Kosaka et al. | |
| 5,768,519 A | 6/1998 | Swift et al. | |

(Continued)

OTHER PUBLICATIONS

Bauer et al, Distributed Algorithms for Multicast Path Setup in Data Networks, IEEE, pp. 181-191, 1996.*

(Continued)

*Primary Examiner*—Frank Duong
(74) *Attorney, Agent, or Firm*—Merchant & Gould, P.C.

(57) ABSTRACT

A method for designating communication paths in a computer network is provided, in which communication paths are designated for the transmission of data throughout a network. The network may have both recipient computers, which are the intended recipients of the data, and intermediary computers, which are not the intended recipients, but merely relay the data. Each intermediary computer is grouped with the "closest" recipient computer (i.e. the recipient computer with whom it is "least expensive" to communicate). Communication paths between the resulting groups are then identified. A representation of the network is then created. The representation replaces the intermediary computers with the inter-group communication paths, so that the inter-group communication paths appear to pass directly through the locations occupied by the intermediary computers. The created representation is then further processed so that the "least expensive" communication paths may be designated.

9 Claims, 12 Drawing Sheets

U.S. PATENT DOCUMENTS

| | | | |
|---|---|---|---|
| 5,774,552 | A | 6/1998 | Grimmer |
| 5,787,441 | A | 7/1998 | Beckhardt |
| 5,787,442 | A | 7/1998 | Hacherl et al. |
| 5,806,074 | A | 9/1998 | Souder et al. |
| 5,832,225 | A | 11/1998 | Hacherl et al. |
| 5,832,275 | A | 11/1998 | Olds |
| 5,832,487 | A | 11/1998 | Olds et al. |
| 5,832,506 | A | 11/1998 | Kuzma |
| 5,884,322 | A | 3/1999 | Sidhu et al. |
| 5,926,816 | A | 7/1999 | Bauer et al. |
| 5,968,121 | A | 10/1999 | Logan et al. |
| 5,968,131 | A | 10/1999 | Mendez et al. |
| 6,049,809 | A | 4/2000 | Raman et al. |
| 6,052,724 | A | 4/2000 | Willie et al. |
| 6,058,401 | A | 5/2000 | Stamos et al. |
| 6,138,124 | A | 10/2000 | Beckhardt |
| 6,212,557 | B1 | 4/2001 | Oran |
| 6,247,017 | B1 | 6/2001 | Martin |
| 6,295,541 | B1 | 9/2001 | Bodnar et al. |
| 6,301,589 | B1 | 10/2001 | Hirashima et al. |
| 6,324,571 | B1 | 11/2001 | Hacherl |
| 6,343,299 | B1 | 1/2002 | Huang et al. |
| 6,377,950 | B1 | 4/2002 | Peters et al. |
| 6,427,209 | B1 | 7/2002 | Brezak et al. |
| 6,446,077 | B2 | 9/2002 | Straube et al. |
| 6,446,092 | B1 | 9/2002 | Sutter |
| 6,457,053 | B1 | 9/2002 | Satagopan et al. |
| 6,516,327 | B1 | 2/2003 | Zondervan et al. |
| 6,529,917 | B1 | 3/2003 | Zoltan |
| 6,532,479 | B2 | 3/2003 | Souder et al. |
| 6,539,381 | B1 | 3/2003 | Prasad et al. |
| 6,557,111 | B1 * | 4/2003 | Theimer et al. ............ 714/4 |
| 6,643,670 | B2 | 11/2003 | Parham et al. |
| 6,647,393 | B1 | 11/2003 | Dietterich et al. |
| 6,751,634 | B1 | 6/2004 | Judd |
| 6,823,338 | B1 | 11/2004 | Byrne et al. |
| 6,865,576 | B1 | 3/2005 | Gong et al. |
| 6,879,564 | B2 | 4/2005 | Parham et al. |
| 6,901,433 | B2 | 5/2005 | San Andres et al. |
| 7,035,922 | B2 | 4/2006 | Parham |
| 7,162,499 | B2 | 1/2007 | Lees et al. |
| 7,184,359 | B1 | 2/2007 | Bridgewater et al. |
| 7,185,359 | B2 | 2/2007 | Schmidt et al. |
| 7,200,847 | B2 | 4/2007 | Straube et al. |
| 2006/0026165 | A1 | 2/2006 | Mohamed et al. |
| 2006/0085428 | A1 | 4/2006 | Bozeman et al. |
| 2006/0168120 | A1 | 7/2006 | Parham |
| 2006/0184589 | A1 | 8/2006 | Lees et al. |
| 2006/0200831 | A1 | 9/2006 | Straube et al. |
| 2007/0162519 | A1 | 7/2007 | Straube, et al. |

OTHER PUBLICATIONS

Eshghi, Kave. Intrinsic References in Distributed Systems. Software Technology Laboratory, HP Laboratories Palo Alto, HPL-2002-32, Feb. 7, 2002, pp. 1-8.

Fetterly, D. et al. A large-scale study of the evolution of Web pages. Software—Practice and Experience, vol. 34, No. 2, May 20-24, 2003, pp. 213-237.

Fu, K. and Kaashoek, M.F. Fast and Secure Distributed Read-Only file System. ACM Transactions on Computer Systems, vol. 20, No. 1, Feb. 2002, pp. 1-24.

Gligor, Virgil D.; Luan, Shyh-Wei; and Pato, Joseph N. On Inter-Realm Authentication in Large Distributed Systems. 1992 IEEE Symposium on Research in Security and Privacy, May 4-6, 1992, pp. 2-17.

Gopal, Burra and Udi, Manber. Integrating Content-based Access Mechanisms with Hierarchical File Systems. Proceedings of the 3rd Symposium on Operating Systems Design and Implementation, Feb. 1999, pp. 1-15.

Gray, Jim N. Notes on Data Base Operating Systems. Lecture Notes In Computer Science, vol. 60: Operating Systems, An Advanced Course; 1978, pp. 393-481.

Gray, Jim, et al. The Dangers of Replication and a Solution. SIGMOD 1996, Jun. 1996, pp. 173-182.

Gulbrandsen, A., et al. A DNS RR for Specifying the Location of Services (DNS SRV). RFC 2782, Feb. 2000, [12 pages].

Guy, Richard G. Ficus: A Very Large Scale Reliable Distributed File System, PhD thesis, University of California, Los Angeles (UCLA technical report CSD-910018); Jun. 3, 1991, pp. 1-125.

Haveliwala, T.; Gionis, A. and Indyk, P. Scalable Techniques for Clustering the Web. In Proceedings of WebDB, 2000, pp. 1-6.

Heidermann, John S.; Page, Thomas W.; Guy, Richard; and Popek, Gerald J. Primarily Disconnected Operation: Experiences with Ficus. Second Workshop on Management of Replicated Data, Nov. 1992, pp. 2-5.

Heintze, N. Scalable document fingerprinting. 1996 USENIX Workshop of E-Commerce, Nov. 1996, pp. 1-10.

How to Optimize Active Directory Replication in a Large Network [online], [retrieved on June 26, 2007]. Retrieved from the internet: <URL: http://support.microsoft.com/kb/244368>.

Huffaker, B., Plummer, D., Moore, D. and Claffy, K. Topology Discovery by Active Probing. In Proceedings of 2002, pp. 1-8.

Hunt, J.W. and McIllroy, M.D. An Algorithm for Differential File Comparison. Computer Science Technical Report 41, Bell Labs, Jun. 1976, pp. 1-9.

Hunt, J.W. and Szymansky, T.G. A Fast Algorithm for Computing Longest Common Subsequences. Communications of the ACM 20(5), May 1977, pp. 350-353.

IDEAL Migration [ONLINE], Pointdev, Aug. 2000 [retrieved on Mar. 3, 2007]. Retrieved from the internet: <URL: www.pointdev.com>.

Implementing Database Replication with JRO [online]. [Retrieved on Jun. 27, 2007] Microsoft Corporation, Jan. 1999, pp. 1-10. Retrieved from: http://msdn2.microsoft.com/en-us/library/aa140026(office.10,d=printer).aspx.

Information Technology - Open Systems Interconnection - The Directory: Protocol Specifications. Recommendation X.519, ISO/IEC 9594-5, 1993, pp. 1-42.

Intel Architecture Software Developer's Manual Volume 1: Basic Architecture. Intel Corporation, 1999, pp. 1-369.

Intel Processor CPUID function (available since 486 processors) 6.15.3 [online], Intel Corporation, 1999 [retrieved on Jun. 26, 2007]. Retrieved from the internet: <URL: http://www.intel.com/design/pentiumii/manuals/24319002.pdf>.

Intel Processor Identification and the CPUID Instruction [online], Intel Corporation, Mar. 2003 [retrieved on Jun. 25, 2007]. Retrieved from the internet: <URL: ftp://download.intel.com/support.processors/procid/24161815.pdf>.

Irmak, U. and Suel, T. Hierarchical Substring Caching for Efficient Content Distribution to Low-Bandwidth Clients. 14th International WWW Conference, May 2005 , pp. 1-11.

Irmak, U.; Mihaylov, S. and Suel, T. Improved Single-Round Protocols for Remote File Synchronization. IEEE Infocom Conference, Mar. 2005, pp. 1665-1676.

ITU-T X.500, Section 11 [online], International Telecommunication Union, Nov. 1993 [retrieved on Jun. 26, 2007]. Retrieved from the internet: <URL: http://www.itu.org>.

ITU-T X.525, Section 11 [online], International Telecommunication Union, Nov. 1993 [retrieved on Jun. 26, 2007]. Retrieved from the internet: <URL: http://www.itu.org>.

Jain, N.; Dahlin, M. and Tewari, R. TAPER: Tiered Approach for eliminating Redundancy in Replica Synchronization. 4th Usenix Conference on File and Storage Technology, FAST, 2005, pp. 1-14.

Jenkins, R. Hash Functions for Hash Table Lookup [online]. [Retrieved on Sep. 21, 2007] 1995-1997, pp. 1-9. Retrieved from: http://burtleburtle.net/bob/hash/evahash.html.

Kohl, J. and Neuman, C. The Kerberos Network Authentication Services (V5). RFC 1510, Sep. 1993, [105 pages].

Korn, D. et al. The VCDIFF Generic Differencing and Compression Data Format. RFC 3284, Jun. 2002, pp. 1-28.

Kulkarni, P. et al. Redundancy Elimination within Large Collections of Files. Proceedings of the 2004 USENIX Annual Technical Conference, Boston, MA, Jun. 27-Jul. 2, 2004, pp. 1-15.

Langford, John. Multiround Rsync. Unpublished, Jan. 31, 2001, pp. 1-11.

Legg, S. and Payne A. LDUP Update reconciliation Procedures. Internet-Draft, Jun. 25, 1999, [28 pages].

Liskov, Barbara et al. Replication in the Harp File System. ACM SIGOPS Operating System Review, vol. 25 No. 5, Oct. 1991, pp. 226-238.

MacDonald, J.P. File System Support for Delta Compression. Master's Thesis, UC Berkeley, May 19, 2000, pp. 1-32.

Manber, Udi and Wu, Sun. GLIMPSE: A Tool to Search Through Entire File Systems. University of Arizona Technical Report TR 93-34, Oct. 1993, pp. 1-10.

Manber, Udi. Finding Similar Files in a Large File System. Technical Report TR 93-33, Department of Computer Science, Univ. of Arizona, Tucson, Oct. 1993, pp. 1-10.

Merkle, R.C. A Digital Signature Based on a Conventional Encryption Function. In A Conference on the Theory and Applications of Cryptographic Techniques on Advances in Cryptology, 1987. pp. 369-378.

Merrells, J. et al. LDAP Replication Architecture. IETF draft, Aug. 5, 1998, pp. 1-31.

Mokapetris, R. Domain Names - Concepts and Facilities. RFC 1034, Nov. 1987, pp. 1-52.

Moy, John. The OSPF Specification. RFC 1131, 1989, [107 pages].

Muthitacharoen, A.; Chen, B. and Maziè, D. A Low-bandwidth Network File System. Proceedings of the 18th SOSP, Banff, Canada, Oct. 2001, pp. 174-187.

NetIQ Migration Suite [Online]. Net IQ Solutions form Attachmate, 2000 [retrieved on Mar. 3, 2007]. Retrieved from the internet: <URL: www.netiq.com>.

Neufeld, G. and Gerald, B. Support for Transactions and Replication in the EAN Directory Service [online], Dept. of Computer Science, University of British Columbia, [retrieved on Jun. 26, 2007]. Retrieved from the internet: <URL: http://www.dss.bc.ca/dss/tech/papers/ulpas94/ulpaa94.ps.gz>.

Novell Directory Services - White Paper. Novell, 1993, pp. 1-8.

OSF 1: OSF™ DCE Application Development Guide, Version 1.0, Prentice-Hall, 1993.

Paxson, Vern. End-to-End Routing Behavior in the Internet. IEEE/ACM Transactions on Networking 5(5), Oct. 1997, pp. 601-615.

Percival, Colin, Naïve Differences of Executable Code. Unpublished Draft Paper, pp. 1-3, 1997.

Petersen, Karin; Spreitzer, Mike; Terry, Douglas; and Theimer, Marvin. Bayou: Replicated Database Services for World-wide Applications. Computer Science Laboratory, Zerox Palo Alto Research Center, 1995, [6 pages].

Polsson, K. Chronology of Microprocessors1990 [online], 2006-2007, last updated Apr. 10, 2007 [retrieved on Jun. 26, 2007]. Retrieved from the internet: <URL: http://www.islandnet.com/~kpolsson/micropro/proc1990.htm>.

Quinlan, S. and Dorward, S. Venti: A New Approach to Archival Storage. Proceedings of the FAST 2002 Confernece on File and Storage Technologies, Jan. 2002, pp. 1-13.

Rabin, Michael. Fingerprinting by Random Polynomials. Report TR-15-81, Cemter for Research in Computing Technology, Harvard University, 1981, pp. 1-14.

Rekhter, Y. et al. Border Gateway Protocol 4 (BGP-4). RFC 1771, Mar. 1995, pp. 1-54.

Saito, Yasushi and Shapiro, Marc. Optimistic Replication. ACM Computing Surveys 37(1), 42-81, Mar. 2005.

Sarin. Sunl K. and Lunch, Nancy A. Discarding Obsolete Information in a Replicated Database System. IEEE, Jan. 1987, pp. 39-47.

Schleimer, S. et al. Winnowing: Local Algorithms for Document Fingerprinting. Proceedings of the 2003 ACM SIGMOD International Conference on Management of Data, Jun. 9-12, 2003, pp. 76-85, 2003.

Siegel, Alex et al. Deceit: A Flexible Distribuited File System. Cornell University Technical Repor TR89-1042, Dec. 1989, pp. 1-34.

Solaris ONC+, Network Information Service Plus (NIS+): an Enterprise Naming Service [online], Sun, [retrieved on Jun. 26, 2007]. Retrieved from the internet: <http://www.sun.com/software/whitepapers/wp-nisplus/>.

Sonntag, Susann et al. Adaptability Using Reflection. In Proceedings of the Twenty-Seventh Hawaii International Conference on System Sciences, 1994, pp. 383-392.

Stokes, Ellen and Good, Gordon. The LDUP Replication Update Protocol. Internet Draft, Oct. 22, 1999, pp. 1-15.

Suel, T.; Noel, P. and Trendafilov, D. Improved File Synchronization Techniques for Maintaining Large Replicated Collections over Slow Networks. IEEE International Conference on Data Engineering, Mar. 2004, pp. 1-12.

System Administration Guide: Naming and Directory Service (NIS+) [online], 1994-2007 [retrieved on Jun. 26, 2007]. Retrieved from the internet: <URL: http://docs.sun.com/app/docs/doc816-4558>.

Teodosiu, Dan et al. Optimizing File Replication over Limited-Bandwidth Networks using Remote Differential Compression. MSR-TR-2006-157, pp. 1-16.

The Administrative Authority Model. Chapter 10 of the X.501 Standard, Nov. 1993, pp. 1-165.

The History of Notes and Domino [online]. [Retrieved on Sep. 21, 2007] DeveloperWorks Lotus, Web Team, IBM, Dec. 20, 2005, pp. 1-24. Retrieved from: http://www.ibm.com/developerworks/lotus/library/ls-NDHistory/.

The Open Group. DCE 1.1: Remote Procedure Call. C706, Oct. 1997, [748 pages].

Trendafilov, D; Memon, N. and Suel, T. Zdelta: An Efficient Delta Compression Tool. Technical Report TR-CIS-2002-02, Polytechnic University, Jun. 26, 2002, pp. 1-14.

Tridgell, Andrew and Mackerras, Paul. The Rsync Algorithm. Technical Report TR-CS-96-05, Australian National University, Jun. 1996, pp. 1-6.

Tridgell, Andrew. Efficient Algorithms for Sorting and Synchronization. PhD Thesis, Australian National University, Feb. 1999, pp. 1-106.

University of Oregon Route Views Project. Advanced Network Technology Center [online], University of Oregon, [retrieved on Jun. 26, 2007]. Retrieved from the internet: <URL: http://www.routeviews.org/2001>.

Using Server Failover [online], 2001 [retrieved on Jun. 26, 2007]. Retrieved from the internet: <URL: http://livedocs.macromedia.com/coldfusion/5.0/Advanced_ColdFusion_Administration/optimize3.htm >.

Walker, Bruce et al. The LOCUS Distributed Operating System. Proceedings of the Ninth ACM Symposium on Operating Systems, 1983, pp. 49-70.

ang, Randolph Y., and Anderson, Thomas E. xFS: A Wide Area Mass Storage File System. Computer Science Division, University of California, Dec. 1993, pp. 1-8.

Weiser, Russel F. and Stokes, Ellen. LDAP V3 Replication Requirements. Internet Draft, Feb. 19, 1999, [15 pages].

Why is there a /vice/db/servers file ?, Coda File System [online], [retrieved on Jun. 26, 2007]. Retrieved from the internet: <URL: http://www.coda.cs.cmu.edu/misc/vice-db-servers.html>.

Wolfson, Ouri and Milo, Amir. The Multicast Policy and its Relationship to Replicated Data Placement. 1991, pp. 181-205.

Wong, K.C. et al. Directory Replication in Distributed Systems. In the Proceedings of the first annual Workshop for the ACM Special Interest Group on Forth—SIGForth '89, 1989, pp. 123-127.

X.500 and DAP [online], [retrieved on Jun. 26, 2007]. Retrieved from the internet: <URL: http://www.itu.int/rec/T-Rec-X.500-199708-S/en>.

X.500 and LDAP [online], [retrieved on Jun. 26, 2007]. Retrieved from the internet: <URL: http://www.collectionscanada.ca/iso/ill/document/ill_directory/X_500andLDAP.pdf>.

Xerox PARC's Bayou Project [online], last edited Jun. 25, 1999 [retrieved on Jun. 26, 2007]. Retrieved from the internet: <URL: http://www2.parc.com/csl/projects/bayou/>.

Xiong, Ming et al. MIRROR: A State-Conscious Concurrency Control Protocol for Replicated Real-time Databases. IEEE Electron Devices Society 1990 Solid-State Sensor and Actuator Workshop, Hilton Head Island, SC, Jun. 4-7, 1990, pp. 20-29.

Zegura, Ellen W., Calvert, Kenneth L. and Bhattacharjee, Samrat. How to Model an Internetwork. IEEE Infocom, Mar. 24-28, 1996, pp. 594-602.

Zhou, Wanle et al. Distributed Object Replication in a Cluster of Workstations. IEEE 2000, May 14-17, 2000, pp. 889-894.

Dijkstra. *A Note on Two Problems in Connection with Graphs*. Numerische Mathematik, 1959 (Introducing Dijkstra's algorithm).

Oracle's SQL-based products, [online] referenced at http://msdn2.microsoft.com/en-us/library/ms151176(printer).aspx. [retrieved on Jan. 3 2008]. Retrieved from the internet: <URL: http://msdn2.microsoft.com/en-us/library/ms151176(printer).aspx>.

Aharoni, E., et al. *Restricted Dynamic Steiner Trees for Scalable Multicast in Datagram Networks*. IEEE/ACM Transactions on Networking, vol. 6, No. 3, Jun. 1998.

Guy, Richard D., et el. *Implementation of the Ficus Replicated File System*. USENIX Conference Proceedings, Anaheim, CA, Jun. 1990, pp. 63-71.

Sidhu, D., et al. *Finding Disjoint Paths in Networks*. 1991 ACM.

X.500, [online] referenced at http://java.sun.com/products/jndi/tutorial/1dap/models/x500.html. [retrieved on Jan. 2, 2008]. Retrieved from the internet: <URL: http://java.sun.com/products/jndi/tutorial/1dap/models/x500.html.

Active Directory Service Interfaces - The Easy Way to Access and Manage LDAP-Based Directories (Windows NT 4.0). Microsoft Corp., Feb. 1997, pp. 1-10.

Ashfield, J.C. et al. "System-independent file management and distribution services" IBM Systems Journal, IBM Corp., vol. 28, No. 2, Jan. 1989, pp. 241-259.

Bennett, J.M.; Bauer, M.A. "An Analysis of Replication Strategies for X.500-like Distributed Directories," Workshop on the Management of Replicated Data, IEEE Computer Society Press, Nov. 1990, pp. 137-142.

Carter, John et al. "Khazana An Infrastructure for Building Distributed Services," Proceedings of the ICDCS'98, IEEE, May 1998, pp. 1-10.

Chappell, David. "New distributed services give Windows NT a boost in large networks", May 1998, pp. 1-6.

Comparing Microsoft Active Directory to Novell's NDS. Microsoft Corporation®, Sep. 1998, pp. 1-26.

Microsoft Active Directory Service Interfaces: ASDI Open Interfaces for Managing and Using Directory Services, Microsoft Corporation, 1997, pp. 1-16.

Technique for replicating distributed directory information. IBM Technical Disclosure Bulletin, IBM Corp., vol. 33, No. 12, May 1, 1991, pp. 113-120, pp. 1-4.

Weider, Chris; Strassner, John; Huston, Bob. "LDAP Multi-Master Replication Protocol" , Nov. 1997, pp. 1-11.

U.S. Appl. No. 10/021,392, filed Dec. 2001, Dewey, et al.

Acevedo, B. et al. *Highly Available Directory Services in DCE*. IEEE Proceedings of FTCS-26, 1996, pp. 387-391.

Aharoni, Ehud et al. *Restricted Dynamic Steiner Trees for Scalable Multicast in Datagram Networks*. IEEE/ACM Transactions on Networking, vol. 6, No. 3, Jun. 1998, pp. 286-297.

Amir, Yair. *Replication Using Group Communication over a Partitioned Network* [online]. 1995. [retrieved on Nov. 25, 2005]. Retrieved from the internet: <URL: http://www.cnds.jhu.edu/~yairamir/Yair__phd.pdf>.

Anderson, D and Shanley, T. *Pentium Processor System Architecture*. MindShare, Inc., 2d ed.,1995, pp. 35-91, 137-165.

Bernstein, Philip. *Review: A Majority Consensus Approach to Concurrency Control for Multiple Copy Databases*. ACM SIGMOD Digital Review 1, 1999 [online], [retrieved on Dec. 20, 2007]. Retrieved from internet: <URL: http://www.informatik.uni-trier.de/~ley/db/journals/dr/Bernstein99.html>.

Bharath-Kumar, Kadaba et al. *Routing to Multiple Destinations in Computer Networks*. IEEE Transactions on Communication, vol. COM-31, No. 3, Mar. 1983, pp. 343-351.

Bloch, J. and Daniels, D. *A Weighted Voting Algorithm for Replicated Directories* [online]. Oct. 1987. [retrieved on Sep. 26, 2006]. Retrieved from the internet: <URL: http://delivery.acm.org/10.1145/40000/31847/p859-bloch.pdf?key1=31847&key2=7203182311&coll=GUIDE&dl=GUIDE&CFID=61158100&CFTOKEN=67129801>.

Beedubail, G. and Pooch, U. *An Architecture for Object Replication in Distributed Systems* [online]. Mar. 1996. [retrieved on Nov. 25, 2005]. Retrieved from the internet: <URL: historical.ncstrl.org/tr/ps/tamucs/TR96-006.ps>.

Carter, Robert et al. *Server Selection Using Dynamic Path Characterization in Wide-Area Networks*. IEEE Infocom '97, vol. 3, Apr. 7-12, 1997, pp. 1014-1021.

Cheung, Roger Y. M. *From Grapevine to Trader: The evolution of Distributed Directory Technology Systems* [online]. [retrieved on Nov. 25, 2005]. Retrieved from the internet: <URL: http://delivery.acm.org/10.1145/970000/962288/p375-cheung.prd?key1=962288&key2=2161182311&coll=GUIDE&dl=GUIDE&CFID=61157293& CFTOKEN=85451120>.

Cho, Haengrae. *Catalog Management in Heterogeneous Distributed Database Systems* [online]. IEEE 1997. [retrieved on Oct. 5, 2006]. Retrieved from the internet: <URL: http://ieeexplore.ieee.org/search/srchabstract.jsp?arnumber=620348&isnumber=13486&punumber=4892&k2dockey=620348@ieeecnfs&query=%28%28+global+catalog+%29+%3Cand%3E+%28pyr+%3E%3D+1950+%3Cand%3E+pyr+%3C%3D+1998%29%3Cin%3Emetadata%29%pos=0>.

*Colt 1.2.0.* [online]. Sep. 9, 2004. [retrieved on Dec. 12, 2007]. Retrieved from the internet: <URL: http://dsd.lbl.gov/~hoschek/colt/index.html>.

*Commons Collections* [online], [retrieved on Dec. 26, 2007]. Retrieved from the internet: <URL: http://commons.apache.org/collections/>.

Ferreira, J.; Borbinha, J.; Delgado, J. *Using LDAP in a Filtering Service for a Digital Library* [online], [retrieved on Nov. 25, 2005]. Retrieved from the internet: <URL: http:www.ercim.org/publications/ws-proceedings/DEL0S5/ferreira.pdf>.

Gulbrandsen, A., et al. *A DNS RR for Specifying the Location of Services (DNS SRV)*. RFC 2052, Oct. 1996, [10 pages].

Gwertzman, J. et al. *The Case for Geographical Push Caching* [online], [retrieved on Dec. 12, 2007]. Retrieved from the internet: <URL: http://citeseer.ist.psu.edu/gwertzman95case.html>.

Howes, Timothy A. *The Lightweight Directory Access Protocol: X. 500 Lite* [online]. Jul. 27, 1995. [retrieved on Nov. 25, 2005]. Retrieved from the internet: <URL: http://www.citi.umich.edu/techreports/reports/citi-tr-95-8.pdf>.

*Intel® Pentium® III Processor - Low Power Module* [retrieved on Dec. 26, 2007]. Retrieved from the internet: <URL: http://www.intel.com/design/support/faq/embed_proces/pentiumiii__lp__mod.htm>.

Jagadish, H.; Jones, M.; Srivastava, D.; Vista, D. *Flexible List Management in a Directory* [online]. 1998. [retrieved on Nov. 25, 2006]. Retrieved from the internet: <URL: http://delivery.acm.org/10.1145/290000/288636/p10-jagadish.pdf?key1=288636&key2=5218382311&coll=GUIDE&dl=GUIDE&CFID=59072875& CFTOKEN=96277493>.

*Jung - Java Universal Network/Graph Framework* [online], [retrieved on Dec. 12, 2007]. Retrieved from the internet: <URL: http://jung.sourceforge.net/>.

Kaashoek, M.; Tanenbaum, A.; Verstoep, K. *Using Group Communication to Implement a Fault-Tolerant Directory Service* [online]. IEEE 1993. [retrieved on Nov. 25, 2005]. Retrieved from the internet: <URL: http://ieeexplore.ieee.org/search/srchabstract.jsp?ip=&arnumber=287715&k2dockey=287715@ieeecnfs&query=%28%28+%28+%7E%7Edomain+name+service%7E%7E%3Cin%3Emetadata+%29+%3Cor%3E+%28+%7E%7E%7Edirectory+service%7E%7E%3Cin%3Eab+%29+%29%29+%3Cand%3E+%28pyr+%3E%3D+1950+%3Cand%3E+pyr+%3C%3D+1998%29&pos=6>.

Keleher, Peter J. *Decentralized Replication Mechanisms in Deno* [online], [retrieved on Oct. 20, 2006]. Retrieved from the internet: <URL: https://drum.umd.edu/dspace/handle/1903/970>.

Kittur, Sunil et al. *Fault Tolerance in a Distributed CHORUS/MiX System* [online], [retrieved on Dec. 12. 2007]. Retrieved from the internet: <URL: http://www.usenix.org/publications/library/proceedings/sd96/full__papers/kittur.ps>.

Lee, K. and Chin, Y. *A New Replication Strategy for Unforeseeable Disconnection under Agent-Based Mobile Computing System* [online], [retrieved on Oct. 20, 2006]. Retrieved from the internet: <URL: http://ieeexplore.ieee.org/iel4/5962/15952/00741037.pdf?isNumber=>.

*LinkSys PAP2 Router* [online]. May 19, 2006. [retrieved on Dec. 13, 2007]. Retrieved from the internet: <URL: http://www.go2call.com/docs/LinkSysManualConfig.pdf>.

Maass, H. *Open Mobility Management Platform with Directory-Based Architecture and Signaling Protocols* [online]. Apr. 1998. [retrieved on Nov. 25, 2005]. Retrieved from the internet: <URL: http://ieeexplore.ieee.org/search/srchabstract.jsp?arnumber=662045&isnumber=14485&punumber=5356&k2dockey=662045@ieeecnfs&query=%28%7E%7Edirectory+replication%7E%7E%29+%3Cand%3E+%28pyr+%3E%3D+1950+%3Cand%3E+pyr+%3C%3D+1998%29&pos=1 >.

Mann, T.; Hisgen, A.; Swart, G. *An Algorithm for Data Replication* [online]. Jun. 1, 1989. [retrieved on Nov. 25, 2005]. Retrieved from the internet: <URL: http://www.hpl.hp.com/techreports/Compaq-DEC/SRC-RR-46.prd>.

Minasi, Mark et al. *Mastering Windows Server 2003*, 2003, pp. 503-504.

Mullender, S.; Rossum, G. *Amoeba—A Distributed Operating System for the 1990s* [online], [retrieved on Nov. 25, 2005] Retrieved from the internet: <URL: http://www.cs.dartmouth.edu/~cs108/papers/mullender90amoeba.pdf.

*NetOp Policy Server Version 3.0* [online], [retrieved on Dec. 6, 2005] Retrieved from the internet: <URL: https://www.crossteccorp.com/support/resources/nps_quick_install.pdf>.

*Novell Cluster Services for NetWare 5.1* [online]. [retrieved on Dec. 26, 2007]. Retrieved from the internet: <URL: http://www.novell.com/products/clusters/ncs101/details.html>.

*Novell Introduces NetWare Clulster Services for NetWare 5* [online]. Sep. 17, 1999. [retrieved on Dec. 26, 2007]. Retrieved from the internet: <URL: http://www.hpcwire.com/archives/16286.html>.

Ogier, Richard et al. *A Distributed Algorithm for Finding Shortest Pairs of Disjoint Paths*. IEEE Infocom '89, vol. 1, 1989, pp. 173-182.

Ordile, Joann J.; Miller, Barton P. *Distributed Active Catalogs and Meta-Data Caching in Descriptive Name Services* [online], [retrieved on Oct. 5, 2006]. Retrieved from the internet: <URL: http://www.huygens.org/cm/cs/doc/93/5-01.ps.gz>.

Pato, J. *Hierarchical Trust Relationship for Inter-Cell Authentication* [online]. Jul. 1992. [retrieved on Dec. 12, 2007]. Retrieved from the internet: <URL: http://www.opengroup.org/tech/rfc/mirror-rfc/rfc7.0.txt>.

Sarin, S.; Floyd, R.; Phadnis, N. *A Flexible Algorithm for Replicated Directory Management* [online]. IEEE 1989. [retrieved on Nov. 25, 2005]. Retrieved from the internet: <URL: http://ieeexplore.ieee.org/search/freesrchabstract.jsp?arnumber=37977&isnumber=1532&punumber=248&k2dockey=37977~ieeecnfs&query=%28+%7E%7Edirectory+replication%7E%7E%3Cin%3Eab+%29&pos=1>.

Severance, C. *Could LDAP Be the Next Killer DAP?* [online]. Aug. 1997. [retrieved on Nov. 25, 2005]. Retrieved from the internet: <URL: http://ieeexplore.ieee.org/search/srchabstract.jsp?tp=&arnumber=607102&k2dockey=607102~ieeejrns&query=%28%28+%28+%7E%7Edomain+name+service%7E%7E%3Cin%3Emetadata+%29+%3Cor%3E+%28+%7E%7Edirectory+service%7E%7E%3Cin%3Eab+%29+%29%29+%3Cand%3E+%28pyr+%3E%3D+1950+%3Cand%3E+pyr+%3C%3D+1998%29& pos=9>.

Shukla, Prashant. *Introduction to Novell Replication Services* [online]. Aug. 1, 1997. [retrieved on Dec. 26, 2007]. Retrieved from the internet: <URL: http://support.novell.com/techcenter/articles/dnd19970802.html>.

Swafford, Steven. *CodeSnip: Enforcing Unique Password Strength in an Oracle Database Based Upon a Role* [online], [retrieved on Dec. 13, 2007]. Retrieved from the internet: <URL: http://aspalliance.com/articleViewer.aspx?aId=746&pId=-1>.

*Understanding X.500 - The Directory* [online], [retrieved on Dec. 13, 2007]. Retrieved from the internet: <URL: http://sec.cs.kent.ac.uk/x500book/>.

*Xerces Java Parser 1.4.4* [online], [retrieved on Dec. 14, 2007]. Retrieved from the internet: <URL: http://xerces.apache.org/xerces-j/>.

*Active Directory LDAP Compliance—White Paper*. Microsoft Corporation, Oct. 2003, pp. 1-16.

Anderson, D and Shanley, T. *Pentium Processor System Architecture*. MindShare, Inc.; chapters 7, 8, 11, 14-16; Appx. A, D (2d ed., 1995).

Aphelion Directory 2003.2 Administration Guide With: Common DUA Service Module (CDSM) Distributed LDAP Service Module (DLSM), Chapter 10.2 "Multi-master Replication Topology" [online] 2003 [retrieved on Dec. 27, 2007]. Retrieved from the internet: <URL: <http://websolver.us.syntegra.com/support/sw/docs/aphelion2003.2/admin/>(click on "Multi-master Replication Topology").

*Concurrency Control* [online], [retrieved on Dec. 27, 2007]. Retrieved from the internet: <URL: http://ftp.research.microsoft.com/users/ccontrol/chapter8.pdf>.

Droms, R. *Dynamic Host Configuration Protocol*. Bucknell University, IETF RFC 2131, Mar. 1997 [retrieved on Dec. 28, 2007]. Retrieved from the internet: <URL: http://www.ieft.org/rfc/rfc2131.txt>, Eisner. *State-of-the-Art Algorithms for Minimum Spanning Trees-A Tutorial Discussion*. University of Pennsylvania, pp. 1-78, 197.

eTrust Directory r8 [online], [retrieved on Dec. 28, 2007]. Retrieved from the internet: <URL: http://www.neam.de/uploads/_downloads/etrust_directory_data_sheet.pdf>.

Guy, R. G.; Popek, G. J.; Page, Jr., T. W. *Consistency algorithms for optimistic replication*. First IEEE Int'l Conf. on Network Protocols, San Francisco, Cal., 1993.

Holbrook, Hugh et al. *Log-Based Receiver-Reliable Multicast for Distributed Interactive Simulation*. Stanford University, 1995 [retrieved on Dec. 28, 2007]. Retrieved from the internet: <URL: http://cs.ecs.baylor.edu/~donahoo/classes/5321/papers/HSC95.pdf>.

Kantor, B. and Lapsley, P. *Network News Transfer Protocol: A Proposed Standard for the Stream-based Transmission of News*. IETF RFC 977, Feb. 1986 [retrieved on Dec. 28, 2007]. Retrieved from the internet: <URL: http://www.ietf.org/rfc/rfc977.txt>.

Novell's eDirectory, "Partitions" [online], [retrieved on Dec. 28, 2007]. Retrieved from the internet: <URL: http://www.novell.com/documentation/edir871/index.html?page=/documentation/edir871/edir871/data/fbachabc.html>.

*Novell eDirectory v. Microsoft Active Directory*. Competitive white paper, Novell [online], [retrieved on Dec. 27, 2007]. Retrieved from the internet: <URL: http://www.novell.com/collateral/4621396/4621396/4621396.pdf>.

Novell's Nterprise Branch Office Product [online], [retrieved on Dec. 28, 2007]. Retrieved from the internet: <URL: http://support.novell.com/techcenter/articles/ana20021101.html>.

Parr, G., *A More Fault Tolerant Approach to Address Resolution for Multi-LAN System of Ethernets*. Network Working Group, RFC 1029, May 1988 [retrieved on Dec. 26, 2007]. Retrieved from the internet: <URL: http://www.ietf.org/rfc/rfc1029.txt>.

Pierce, Benjamin. *Harmony: The Art of Reconciliation* [online], [retrieved on Dec. 28, 2007]. Retrieved from the internet: <URL: http://www.cis.upenn.edu/~bcpierce/papers/harmony-tgc-talk-2005.pdf>.

*Royalty-Free CIFS Technical Reference License Agreement*. CIFS Protocol, Microsoft [online], [retrieved on Dec. 28, 2007]. Retrieved from the internet: <URL: http://msdn2.microsoft.com/en-us/library/aa302242.aspx>.

Ryan, V. et al. *Schema for Representing Java™ Objects in an LDAP Directory*. IETF RFC 2713, Oct. 1999 [retrieved on Dec. 28, 2007]. Retrived from the internet: <URL: http://www.ietf.org/rfc2713.txt>.

Saito, Yasushi. *Consistency Management in Optimistic Replication Algorithms*. Jun. 15, 2001 [retrieved on Dec. 28, 2007]. Retrieved from the internet: <URL: http://www.ysaito.com/replica.pdf>.

Srinivasan, V. and Mogus, J. *Spritely NFS: Experiments with and Implementation of Cache-Consistency Protocols*, Chapter 6.2 "Delaying the SNFS close operation." Research Report 89/5, Digital Equipment Corporation, Mar. 1989 [online], [retrieved on Dec. 28, 2007]. Retrieved from the internet: <URL: http://www.hpl.hp.com/techreports/Compaq-DEC/WRL-89-5.pdf>.

Stokes, E., et al., *Lightweight Directory Access Protocol (version 3) Replication Requirements*. IETF RFC 3384, Oct. 2002 [retrieved on Dec. 26, 2007]. Retrieved from the internet: : <URL: http://www.ietf.org/rfc/rfc3384.txt>.

Thomas, Robert H. *A Majority Consensus Approach to Concurrency Control for Multiple Copy Databases*. ACM Transactions on Database Systems, vol. 4, No. 2, Jun. 1979, pp. 180-209.

*Transmission Control Protocol, Darpa Internet Program, Protocol Specification*. Information Sciences Institute, IETF RFC 793, Sep. 1981, [91 pages] [retrieved on Dec. 28, 2007]. Retrieved from the internet: <URL: http://www.ietf.org/rfc/rfc793.txt>.

Veizades, J., et al. *Service Location Protocol*. IETF RFC 2165, Jun. 1997, [67 pages]. [retrieved on Dec. 28, 2007]. Retrieved from the internet: : <URL: http://www.ietf.org/rfc/rfc2165.txt>.

*Which Directory Offers the Best LDAP Server?* White paper, Novell [retrieved on Dec. 28, 2007]. Retrieved from the internet: <http://www.novell.com/info/collateral/docs/4621218.01/4621218.pdf>.

Zeilenga, K. *Named Subordinate References in Lightweight Directory Access Protocol (LDAP) Directories*. RFC 3296, Jul. 2002, [14 pages] [retrieved on Dec. 28, 2007]. Retrieved from the internet: : <URL: http://www.ietf.org/rfc/rfc3296.txt>.

Ajtai, M. et al. Compactly Encoding Unstructured Inputs with Differential Compression. Journal of the ACM, vol. 49, No. 3, May 2002, pp. 318-367.

AMD64 Technology. AMD64 Architecture Programmer's Manual vol. 3: General-Purpose and System Instructions. Advanced Micro Devices, Sep. 2006, pp. 1-466.

Anderson, Anne. DCE 1.1 Hierarchical Cells Security Functional Specification, Draft. Oct. 5, 1993, [15 pages].

Birrell, Andrew D.; Hisgen, Andy; Jerian, Chuck, Mann, Timothy and Swart, Garret. The Echo Distributed File System. Technical Report 111, Digital Equipment Carp. Systems Research Center, Sep. 1993, [26 pages].

Bjørner, N. et al. Content Dependent Chunking for Differential Compression, The Local Maximum Approach. MSR Technical Report, Dec. 2006, pp. 1-90.

Broder, A.Z. et al. Syntactic clustering of the Web [online]. [Retrieved on Sep. 21, 2007] Proceedings of the 6th International Conference on WWW, Sep. 1997, pp. 1-16. Retrieved from: http://www.std.org/msm/common/clustering.html.

Broder, A.Z. On the resemblance and containment of documents. Proceedings of the Compression and Complexity of Sequences, Jul. 11-13, 1997, pp. 21-29.

Byte.com. New Replication Options in Access, Oracle and Notes. Byte Magazine Article, Oct. 1995, pp. 1-4.

Byte.com. Notes Replication: Outstanding in Its Field. Byte Magazine Article, Oct. 1995, pp. 1-4.

Calvert, Kenneth L.; Doar, Matthew B. and Zegura, Ellen W. Modeling Internet Topology. IEEE Communications Magazine, 1997, vol. 35, No. 6, pp. 160-163.

Can I Rename my Windows 2000 Domain. Petri IT Knowledgebase. [online], [retrieved on Aug. 1, 2007]. Retrieved from the internet: <URL: http://www.petri.co.il/w2k_domain_rename.htm>.

Chan, M.C. and Woo, T.Y.C. Cache-based Compaction: A New Technique for Optimizing Web Transfer. Proc. of the IEEE Infocom Conference, 1999, pp. 117-125.

Chapter 7. Installing a Coda Server [online]. File System User and System Administrators Manual, [retrieved on Jun. 26, 2007]. Retrieved from the internet: <URL: http://coda.planetmirror.com/doc/html/manual/x1243.html>.

Cox, L.P. et al. Pastiche: Making Backup Cheap and Easy. 5th Symposium on Operating System Design and Implementation, Dec. 9-11, 2002, pp. 1-15.

DCE Distributed File System [online]. [Retrieved Sep. 21, 2007] Wikipedia, pp. 1-2. Retrieved from http://en.wikipedia.org/wiki/DCE_Distributed_File_System.

Directory Services and Military Messaging [online], CIT03.03 SEIWG Assessment, Joint Warrior Interoperability Demonstration 2004 Final Report, 2004 [retrieved on Jun. 26, 2007]. Retrieved from the internet: <URL: http://www.cwid.js.mil/public/cwid05fr/htmlfiles/c303sei.html>.

Doar, Matthew B. A Better Model for Generating Test Networks. Ascom Nexion, 1996, pp. 1-21.

* cited by examiner

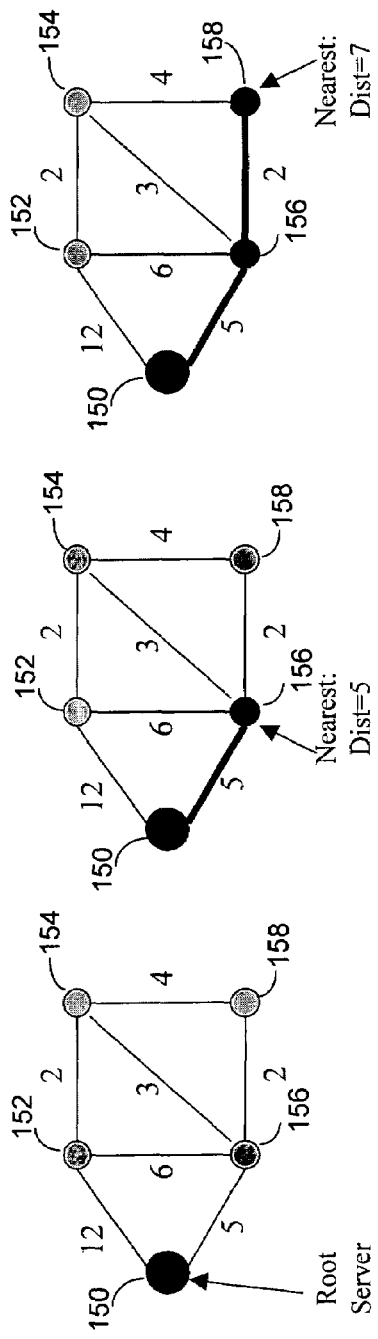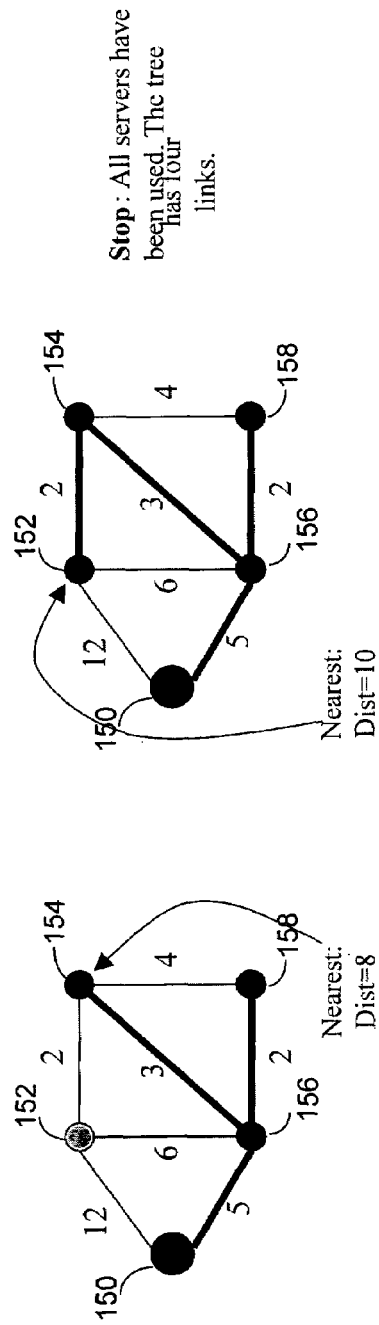

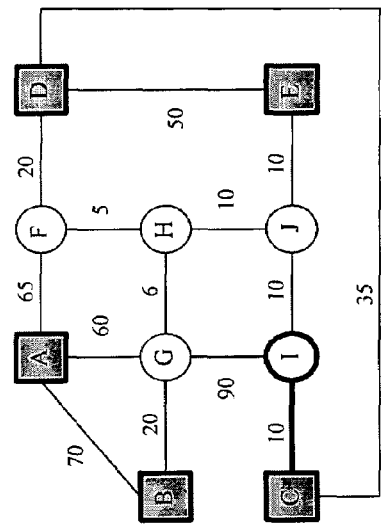
FIG. 4A
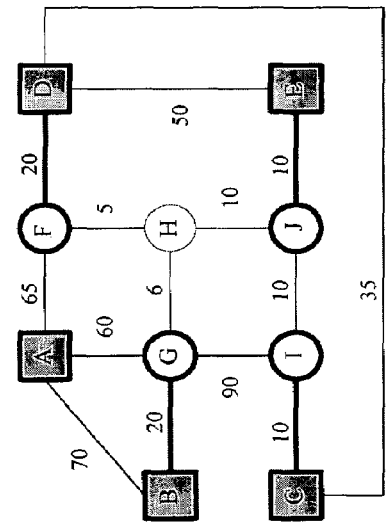
FIG. 4B
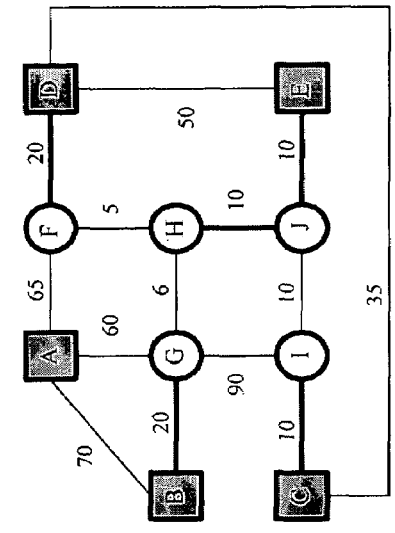
FIG. 4C
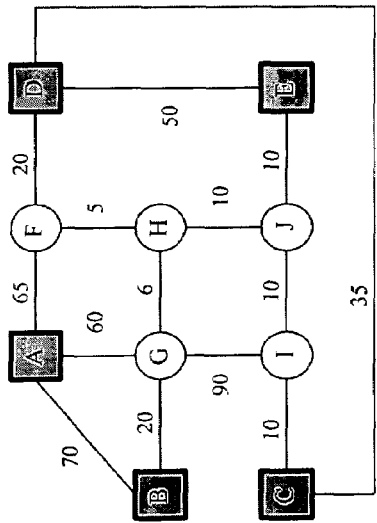
FIG. 4D
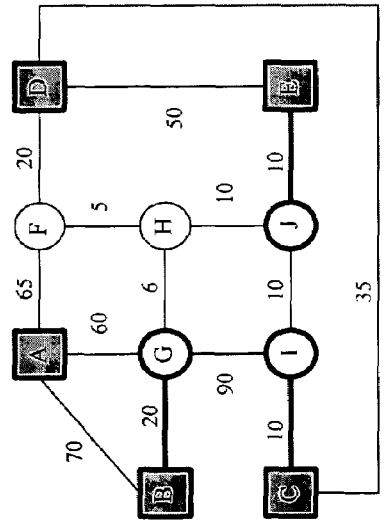
FIG. 4E
FIG. 4F The sum of the paths is
70+20+6+10+10+10+10+35 =
171.

However, since the edge from J to E is part of two paths - the path from B to E and the path from C to E - the cost of the path from J to E (10) is incurred twice. Thus the total cost of the communication path is 171 + 10 = 181.

METHOD FOR DESIGNATING COMMUNICATION PATHS IN A NETWORK

CROSS REFERENCE TO RELATED APPLICATION

This application is a continuation application of U.S. patent application Ser. No. 09/795,202, filed Feb. 28, 2001 now U.S. Pat. No. 6,879,564.

TECHNICAL FIELD

The invention relates generally to the transmission of data to multiple computers in a computer network and, more particularly, to a designating the minimum-cost paths for disseminating data in a computer network.

BACKGROUND OF THE INVENTION

In the field of computer networking, many efforts have been made to determine the best way for servers within a computer network to communicate with one another. In particular, the problem of which network links to use has been a challenge. While there may be a dozen paths that communication between two computers may use, only one or two of those paths may actually be the best. In making this determination, a network engineer may have a set of parameters to follow. These parameters may include: minimizing the distance that communications need to travel, maximizing the bandwidth available for each communication, or minimizing the amount of money spent creating the links between the computers. Such parameters will hereinafter be grouped under the general category of "cost." In other words, a network engineer tries to minimize the cost of sending messages between computers in a network. The "cost" of a network link as used herein may include, but is not limited to, one or more of the following: the time it takes for data to travel over the link, the physical length of the link, or the monetary cost of the link. Thus, if travel time is being used as a parameter, then a "cheap" link is one that is relatively fast, whereas an "expensive" link is relatively slow.

Several techniques have been developed to create minimum-cost network topologies. However, many of these techniques become unworkable when the problem of intermediate servers is introduced into a network. Intermediate servers are those servers that co-exist in a network with the servers for which communication is being optimized, but are not the intended recipients of the message. Those servers that are the intended recipients will be referred to herein as "recipient servers."

For example, servers on computer networks may share what is known as a "multi-master" or "distributed" database, in which multiple servers share responsibility for keeping the contents of the database current. An example of such a database is the MICROSOFT ACTIVE DIRECTORY SERVICE. Copies of parts or all of a shared database may be stored on several servers. When one server makes a change to a portion of the database, that change needs to be transmitted to all of the other servers that possess copies of that portion. Transmitting database changes from one server to another is also known as "replicating" the changes. Replication among the various servers of a network takes place according to an established pattern or "replication topology." Those servers that share the responsibility for maintaining the shared database will be referred to herein as "replicating servers." A replicating server is one implementation of a "recipient server."

There are many situations in which a network may have both replicating servers and intermediate servers. One such situation is when a shared database is divided into several partitions, in which a server may only exchange database updates with another server in the same partition. For example, a corporate directory may be divided into sales, development and marketing partitions, such that sales servers only replicate with other sales servers, development servers only replicate with other development servers, and marketing servers only replicate with other marketing servers. In such a network, dissimilar servers would be seen as intermediate servers with respect to one another. For example, marketing servers and development servers would be seen as intermediate servers by the sales servers, since sales data would not be replicated by the other two types of servers, but would simply be passed through. Data replicated between recipient servers may have to pass through these intermediate servers, and therefore they may need to be considered when determining a minimum-cost replication scheme.

Thus it can be seen that there is a need for a new method for designating communication paths in a computer network.

SUMMARY OF THE INVENTION

In accordance with the foregoing, a method for designating communication paths in a computer network is provided. According to the invention, communication paths are designated for the transmission of data throughout a network that has both recipient computers, which are the intended recipients of the data, and intermediary computers, which are not the intended recipients, but merely relay the data. Each intermediary computer is grouped with the "closest" recipient computer (i.e. the recipient computer with whom it is "least expensive" to communicate). Communication paths between the resulting groups are then identified. A representation of the network is then created. The representation replaces the intermediary computers with the inter-group communication paths, so that the inter-group communication paths appear to pass directly through the locations occupied by the intermediary computers. The created representation is then further processed so that the "least expensive" communication paths may be designated.

Additional features and advantages of the invention will be made apparent from the following detailed description of illustrative embodiments that proceeds with reference to the accompanying figures.

BRIEF DESCRIPTION OF THE DRAWINGS

While the appended claims set forth the features of the present invention with particularity, the invention, together with its objects and advantages, may be best understood from the following detailed description taken in conjunction with the accompanying drawings of which:

FIGS. 3a-3e, are an example of a procedure that may be followed in an embodiment of the invention to create a tree for a shortest path forest;

FIGS. 4a-4f show an example of how to create a shortest-path forest from the network of FIG. 4;

DETAILED DESCRIPTION OF THE INVENTION

Although it is not required, the invention may be implemented by program modules that are executed by a computer. Generally, program modules include routines, objects, components, data structures and the like that perform particular tasks or implement particular abstract data types. A program may include one or more program modules. The invention may be implemented on a variety of types of computers, including personal computers (PCs), hand-held devices, multi-processor systems, microprocessor-based programmable consumer electronics, network PCs, minicomputers, mainframe computers and the like. The invention may also be employed in distributed computing environments, where tasks are performed by remote processing devices that are linked through a communications network. In a distributed computing environment, modules may be located in both local and remote memory storage devices.

Figure 1:
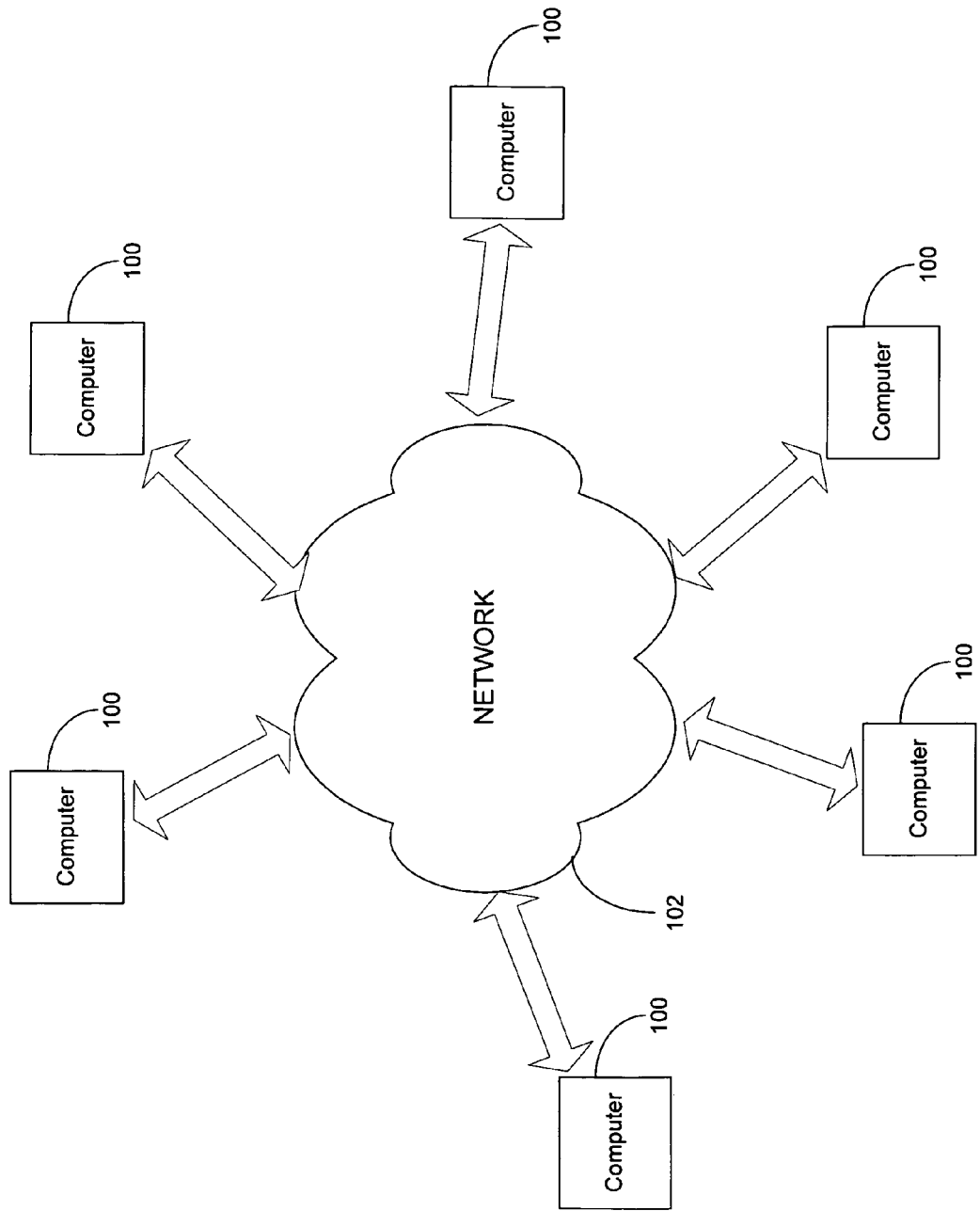
FIG. 1 is an example of a computer network.

An example of a networked environment in which this system may be used will now be described with reference to FIG. 1. The example network includes several computers 100 communicating with one another over a network 102, represented by a cloud. Network 102 may include many well-known components, such as routers, gateways, hubs, etc. and may allow the computers 100 to communicate via wired and/or wireless media.

Figure 2:
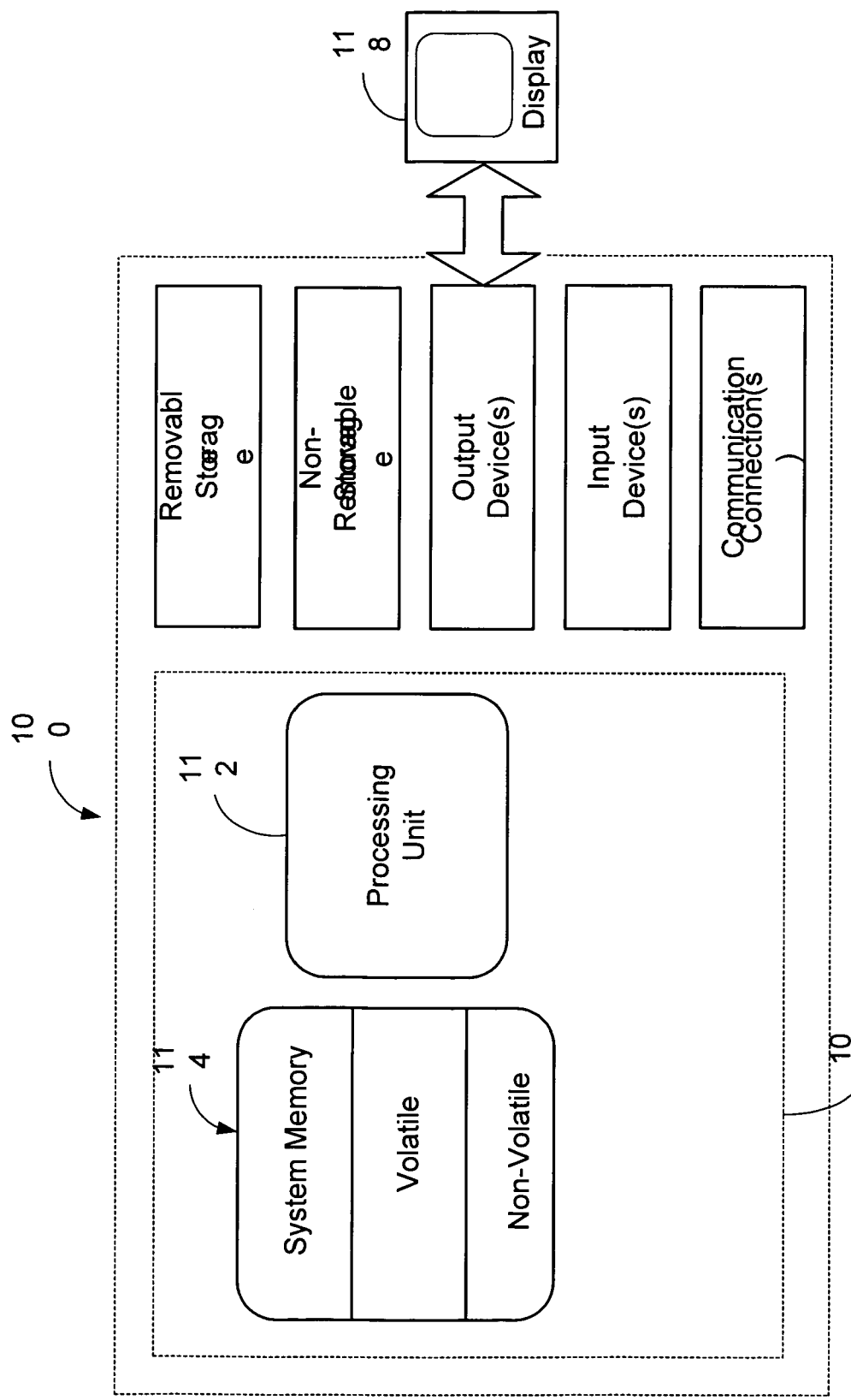
FIG. 2 is an example of a computer.

Referring to FIG. 2, an example of a basic configuration for a computer on which the system described herein may be implemented is shown. In its most basic configuration, the computer 100 typically includes at least one processing unit 112 and memory 114. Depending on the exact configuration and type of the computer 100, the memory 114 may be volatile (such as RAM), non-volatile (such as ROM or flash memory) or some combination of the two. This most basic configuration is illustrated in FIG. 2 by dashed line 106. Additionally, the computer may also have additional features/functionality. For example, computer 100 may also include additional storage (removable and/or non-removable) including, but not limited to, magnetic or optical disks or tape. Computer storage media includes volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to stored the desired information and which can be accessed by the computer 100. Any such computer storage media may be part of computer 100.

Computer 100 may also contain communications connections that allow the device to communicate with other devices. A communication connection is an example of a communication medium. Communication media typically embodies computer readable instructions, data structures, program modules or other data in a modulated data signal such as a carrier wave or other transport mechanism and includes any information delivery media. By way of example, and not limitation, communication media includes wired media such as a wired network or direct-wired connection, and wireless media such as acoustic, RF, infrared and other wireless media. The term computer readable media as used herein includes both storage media and communication media.

Computer 100 may also have input devices such as a keyboard, mouse, pen, voice input device, touch input device, etc. Output devices such as a display 116, speakers, a printer, etc. may also be included. All these devices are well known in the art and need not be discussed at length here.

According to an embodiment of the invention, the topology of a computer network having intermediate servers may be generated or reorganized so that each intermediate server is grouped with the recipient server with which it is cheapest to communicate. These groupings will be referred to herein as "trees," with the collection of trees being referred to as a "shortest-path forest." In a shortest-path forest, each tree has a replicating server as its "root," and possibly one or more intermediate servers as its "branches." Links between these groups or "trees" may then be identified and the paths between recipient servers through the branches and through the inter-tree links may be represented without the intermediate servers. As used herein, the terms "shortest path" "closest" and the like do not necessarily equate to physical distance, but are rather meant to be expressions of cost as defined in the Background section. In other words, two servers having a direct link between them that is relatively cheap are said to be "close." Likewise, the "shortest path" between two servers is really the "cheapest" path in terms of bandwidth, monetary cost, speed, physical distance or whatever other criteria is being used to set up the communication topology.

In one embodiment of the invention, a shortest path forest is first generated using a procedure that is based on Dijkstra's Algorithm. According to this procedure, the replicating servers are designated as the roots. Then, each intermediate server is grouped with the root having the cheapest link to it. Referring to FIGS. 3a-3e, an example of a procedure that may be followed in an embodiment of the invention to create a tree for a shortest path forest is shown. It is assumed in this example that server 150 is a recipient server, while servers 152, 154, 156 and 158 are intermediate servers. The costs of the links between the servers is also shown. For example, the cost of the link between server 152 and 154 is 2 units. Again, the units can signify any factor or combination of factors that need to be minimized.

According to the procedure, the server 150 is designated as the root server as shown in FIG. 3a. Server 156 is then determined to be the intermediate server that is closest to the root server (i.e. the intermediate server to which the link is cheapest), since the link to it costs 5. The server 156 is therefore added to the shortest path tree (FIG. 3b). In the following phase of the procedure, the server 158 is determined to be the next closest intermediate server (with a cost of 5+2=7). The server 158 is thus added to the tree (FIG. 3c). The program continues this process as shown in FIGS. 3d-3e, until all intermediate servers are grouped into the tree. The result is a shortest path tree that has server 150 as its root and servers 152, 154, 156 and 158 as its branches via the boldfaced links.

Figure 4:
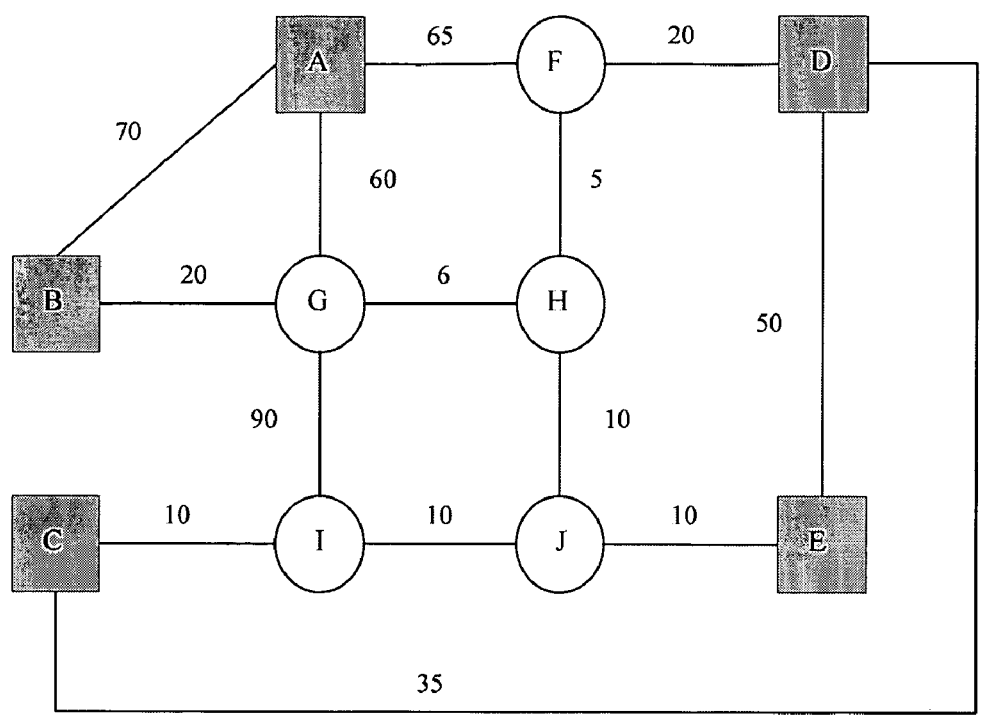
FIG. 4 shows a network having both recipient servers and intermediate servers.

An example of a procedure that creates a shortest-path forest according to an embodiment of the invention will now be described. To aid in this example, a network having both recipient servers and intermediate servers is shown in FIG. 4. The network, generally labeled 180, maintains a directory service database that is shared by servers A-J. These servers replicate changes to the database to one another. The database is divided into several partitions, including a "sales partition." The sales partition is maintained by sales servers A-E while the other partitions are maintained by intermediate servers F-J. The cost of each link is also shown. To create a shortest path forest from the network 180, the recipient servers A-E are designated to be roots, as shown in FIG. 4a. Then, the intermediate server that is closest to the roots is identified. In this example, intermediate servers I and J are each 10 units away from the roots (servers C and E). Thus, server I is grouped with server C, and server J is grouped with server E (FIGS. 4b and 4c). Since servers I and J have already been grouped with respective roots, they should not be grouped with any other roots. The procedure then continues as shown in FIGS. 4d and 4e, in which the next closest intermediate servers are identified and grouped with the root servers to which they are closest. Thus, server G is grouped with server B, while server F is grouped with server D. Thus far, four trees have been created, having servers B, C, D and E as their roots. Since all of the intermediate servers having direct links to root servers have been accounted for, the procedure will move on to the next layer of intermediate servers. In this example, there is only one intermediate server remaining—server H. The root server closest to server H is server E, with a total distance (i.e. cost) of 20 units. This includes the distance of 10 from server H to server J plus the distance of 10 from server J to server E. Thus, server H is added on as a "branch" to the tree whose root is server E (FIG. 4f).

Figure 5:
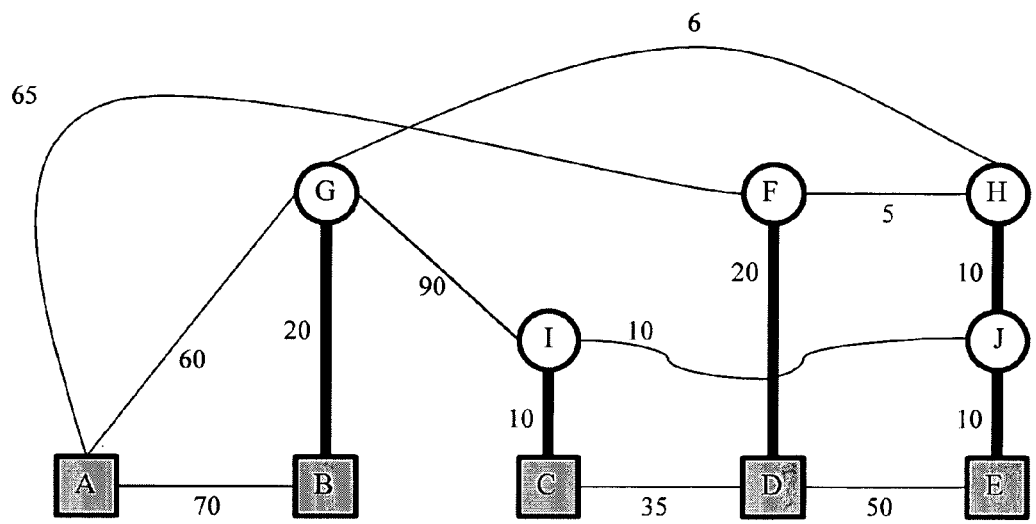
FIG. 5 shows how the network of FIG. 4 may then be redrawn after a shortest-path forest has been created.
Figure 6:
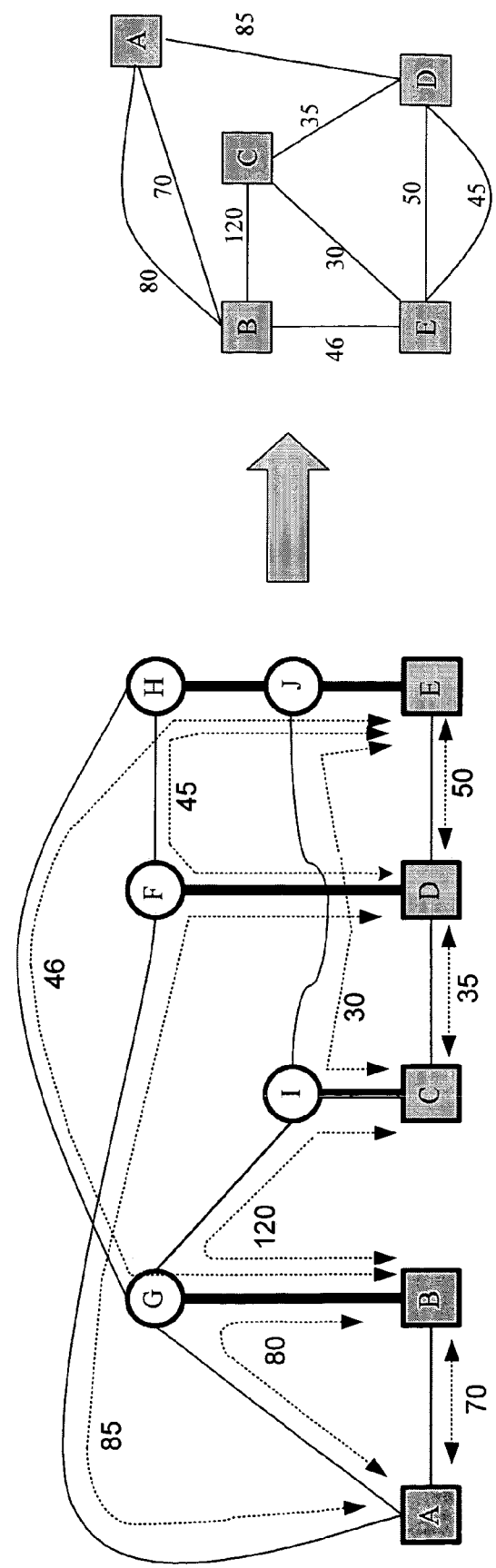
FIG. 6 illustrates a modified network representation that does not have intermediary servers.

Once all of the servers of the network 180 have been grouped into trees, the shortest-path forest can be considered complete. The network 180 may then be redrawn so that the roots of the trees are at the bottom, as shown in FIG. 5. As shown, the trees do not touch one another. Based on the shortest-path forest representation of the network, the intermediate servers G-J can be eliminated, leaving only the sales servers A-F. In an embodiment of the invention, this may be accomplished by the following: for each link in the shortest-path forest that connects two trees, calculating the total cost of the path that connects the roots of the two trees over those links—including any intervening branches, and creating a new replication topology map that shows the link as passing directly from one root to another, without any intervening servers, and having the calculated total cost. This is illustrated in the modified network representation 190 of FIG. 6.

Now, the most efficient network links for the recipient servers of the network 180 to use for communication can be determined. Typically, determining which network links to use for sending data between recipient servers involves three goals. First, all recipient servers should be connected in the communication topology. Second, redundant communication paths should be avoided. Finally, the total cost of the network links used in the topology should be minimized. One way to fulfill these three goals is to create a so-called "minimum-cost spanning tree"—referred to herein as a "spanning tree." Several methods exist for creating a spanning tree, one of which involves the use of Kruskal's algorithm, developed by Joseph Kruskal of BELL LABS. This method involves:

(1) Finding the cheapest link that has not yet been considered;
(2) If the link is not redundant, adding it to the tree;
(3) If there are no more edges, stopping the procedure; and,
(4) If there are more edges, repeating steps (1)-(3).

Figure 7A:
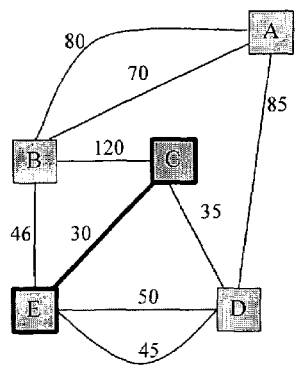
FIGS. 7a-7g show an example how a spanning tree may be created from the modified network representation of FIG. 6.
Figure 7B:
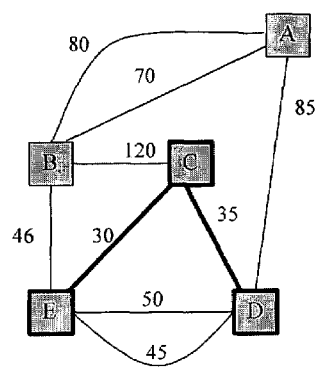
Figure 7C:
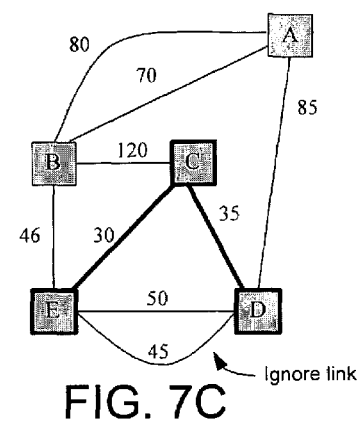
Figure 7D:
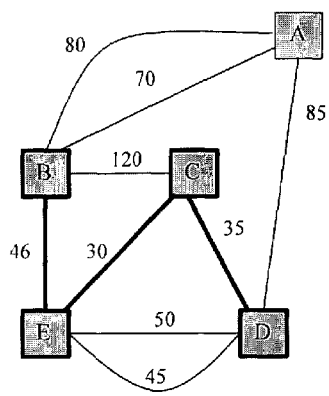
Figure 7E:
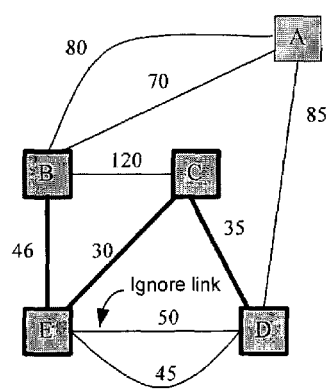
Figure 7F:
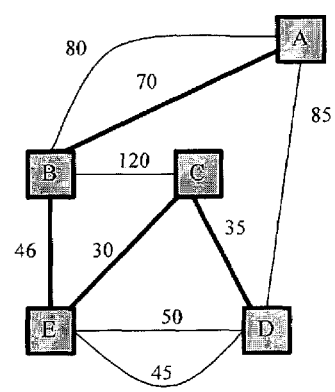
Figure 7G:
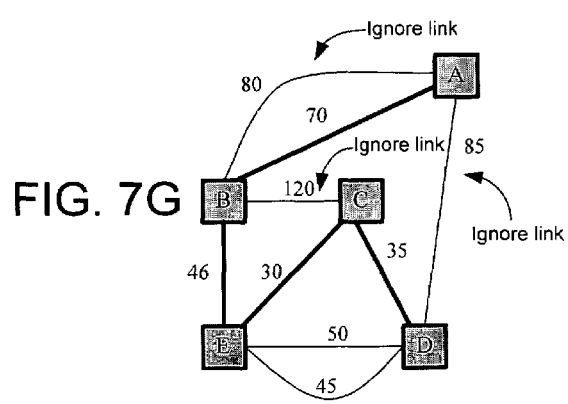
Figure 8:
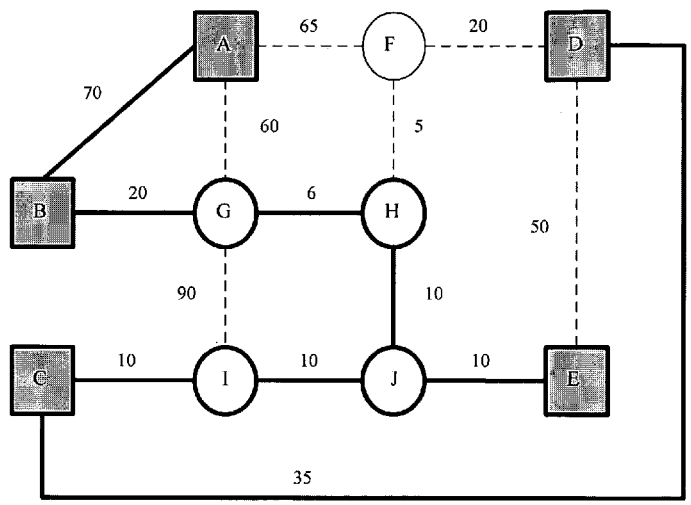
FIG. 8 shows the final topology of the network of FIG. 4 after a procedure is performed according to an embodiment of the invention.

Referring to FIGS. 7a-7g, an example how a spanning tree may be created from the modified network representation 190 will now be described. First, the cheapest link is identified. In this case, the cheapest link is the one between servers E and C. Since the link is not redundant, it is added to the spanning tree (FIG. 7a). The next cheapest link is the one between servers C and D. Again, since the link is not redundant, it is added to the spanning tree (FIG. 7b). The process then moves to the next cheapest link, which is the 45-unit link between servers E and D. This link is redundant, since there is already a path between servers E and D in the spanning tree—namely, the path that passes through server C (FIG. 7c). The process then continues, and the link between servers B and E is added (FIG. 7d), the 50-unit link between servers E and D is ignored (FIG. 7e), the link between servers B and A is added (FIG. 7f), and the remaining links that are not already in the spanning tree are ignored (FIG. 7g). At this point, the generation of the communication topology for the network 180 (FIG. 4) is complete. The final version of the topology is illustrated in FIG. 8, with the intermediate servers being shown in their respective positions. The total cost of the communication path (in bold) is 181 units.

In the previous examples, it has been assumed that there is full connectivity between the various servers of the network 180. In reality certain links may not have full connectivity with one another, even if they have endpoints at the same server. For example, a bridge may be required to get data from one link to another. When bridges are present, the above-described procedure may have to be modified so that a shortest-path forest is generated for each bridge prior to the creation of a minimum-cost spanning tree. Also, some links may use incompatible transport protocols, or be available only at certain times. In such cases, the above-described procedure may also have to be modified so that those servers that share a transport protocol or have compatible schedules are treated separately for the purpose of generating a shortest-path forest.

In an embodiment of the invention, the network 180 (FIG. 4) is implemented as a shared database network in which servers A-E are replicating servers and servers F-J are intermediate servers. For example, the network 180 may be a directory service network that is partitioned between sales, marketing and development. The servers A-E may be sales servers, and have the need to replicate sales directory changes to one another, while the servers F-J may be either marketing or development servers, which do not change the sales directory and do not need to receive sales directory changes. In this embodiment, the goal of the shortest-path forest and spanning tree procedures described in conjunction with FIG. 4, FIGS. 4a-j, FIG. 5, FIG. 6, FIGS. 7a-7g and FIG. 8 is to establish the most optimal replication paths between replicating servers A-E.

Figure 9:
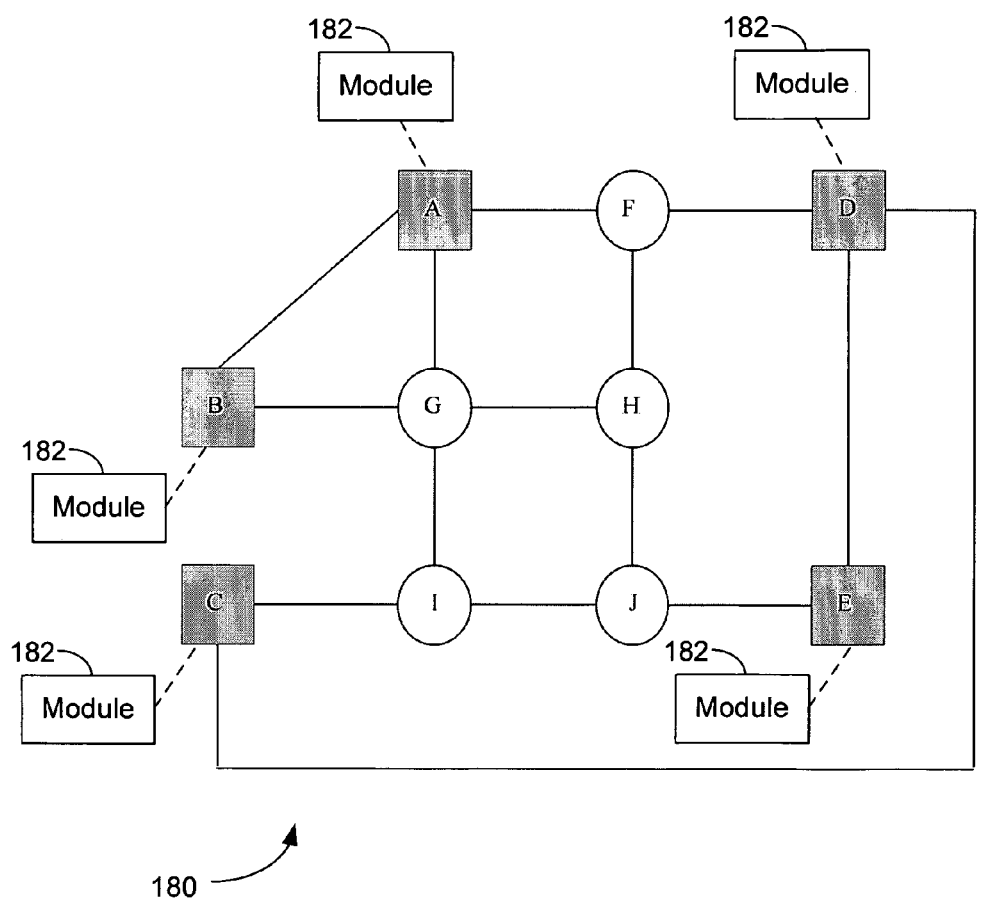
FIG. 9 shows an example architecture of an embodiment of the invention.

There are many ways to implement the present invention in software. In one implementation, illustrated in FIG. 9, a software module 182 executes on each of the recipient servers A-E, maintains a communication topology map, and is responsible for communicating with the other servers as necessary. For example, if the network 180 is a shared database network, then the software module 182 on each recipient (i.e. replicating) server A-E would be responsible for maintaining a replication topology map and for ensuring that all database updates that occurred locally are replicated to other replicating servers along the designated replication paths.

The invention described herein may be used to establish communication paths between computers located at the same site and/or between groups of computers located at different sites. Referring to FIG. 4, for example, the servers A-E may represent five satellite offices located in five different cities. Each satellite office may have dozens of computers, but with only one server in the office designated to communicate outside of the site. There may be one communication topology map for communication within a site and another map for communication between sites.

When implemented on a shared database network, it may be desirable to modify certain aspects of the invention in order to account for read-only servers. For example, in a directory service database, some servers may hold 'writeable' copies of a partition, while others may hold 'read-only' copies. In such a scenario, database replication may be set up so that changes are only replicated from writeable servers. In other words, replication between two writeable servers occurs in both directions, but if a writeable server and a read-only server are involved, then replication only occurs from the writeable server to the read-only server, and not vice versa.

According to an embodiment of the invention, additional parameters may be included in the process of designating communication links in order to account for the presence of read-only servers. These parameters include, but are not limited to:

(1) All writeable servers should be linked to one another without any intervening read-only servers;

(2) Read-only servers should be connected to the writeable servers so that they can replicate in any changed data; and, (3) Read-only servers should not replicate in from other read-only servers, since the other read-only servers cannot possibly have any changes. However, read-only servers may replicate from other read-only servers if required by the communication links of the network. An example would be where a read-only server was connected to the rest of the network solely by a link to another read-only server that was, itself, well connected to the rest of the network.

Figure 10:
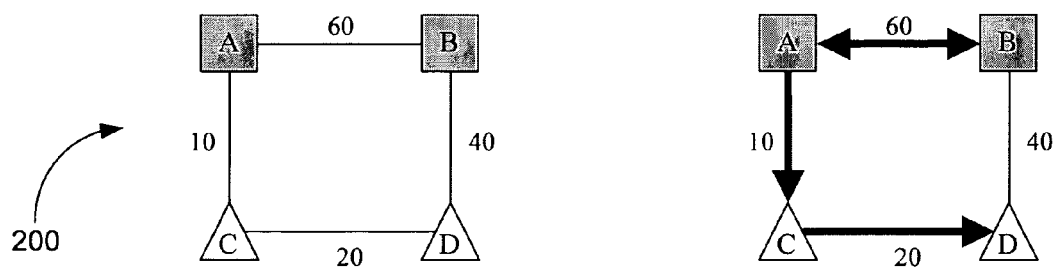
FIG. 10 shows how communication may occur in a network having some servers that are designated as read-only and some servers that are designated as writeable; and, FIG. 11 shows an example of how a two-tier topology may result when read-only and writeable servers are used in an embodiment of the invention.

To illustrate an implementation of these parameters, a simple network, generally labeled 200, is shown in FIG. 10, with the resulting spanning tree next to it. Even though the link between servers A and B is the most expensive, parameter number one indicates that it should be used for replication, since servers A and B are both writeable. Additionally, since server D is read-only, any changes to it must have come from server C. Thus, server C does not have to replicate from server D.

Figure 11:
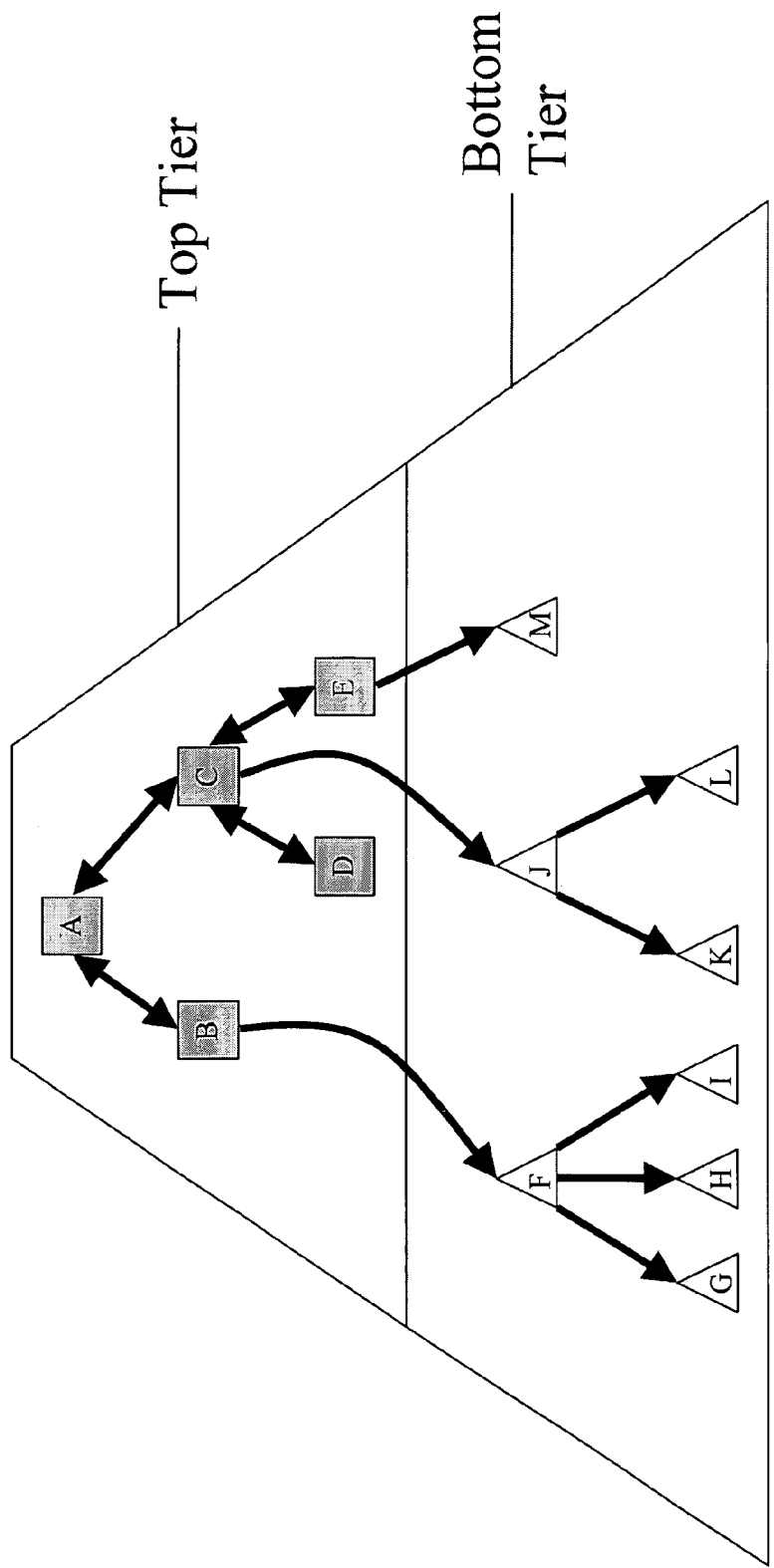

As a result, when there are both writeable and read-only servers in a shared-database network, and this embodiment of the invention is used, the replication topology ends up being a 'two-tiered' tree, in which the top tier includes all of the writeable servers linked in a bi-directional minimum spanning tree, and the bottom tier includes the read-only servers. The bottom tier may include several trees appended to the tier, in which replication occurs in a downward direction. In this example, "downward" means "away from the writeable servers." An example of a two-tier tree is shown in FIG. 11. As it can be seen, some read-only servers are closer to the writeable servers than other read-only servers, but the closer read-only servers don't need to replicate in from the farther ones.

It can thus be seen that a new a useful method for designating communication paths in a network has been provided. In view of the many possible embodiments to which the principles of this invention may be applied, it should be recognized that the embodiments described herein with respect to the drawing figures is meant to be illustrative only and should not be taken as limiting the scope of invention. For example, those of skill in the art will recognize that the elements of the illustrated embodiments shown in software may be implemented in hardware and vice versa or that the illustrated embodiments can be modified in arrangement and detail without departing from the spirit of the invention. Therefore, the invention as described herein contemplates all such embodiments as may come within the scope of the following claims and equivalents thereof.

What is claimed is:

1. One or more computer storage media containing executable instructions that, when executed, implement the following steps:

creating one or more communication groups from a plurality of servers sharing a distributed database, wherein the plurality of servers has one or more replicating servers and at least two intermediate servers, each communication group being created by grouping each a first intermediate server with at least a second intermediate server and a replicating server, wherein the intermediate servers are grouped with the replicating server with which it is optimal for the intermediate servers to communicate;

identifying one or more inter-group communication paths, each inter-group communication path connecting two or more groups;

creating a replication topology representation having a plurality of primary communication paths in which the intermediate servers are replaced with the inter-group communication paths; and determining optimal communication paths using the replication topology representation.

2. The one or more computer storage media of claim 1, wherein the grouping of intermediate servers with a replicating server further comprises:

for each intermediate server, determining which replicating server of one or more replicating servers has a fastest intra-group communication path to each intermediate server and grouping the intermediate servers with the replicating server providing the fastest intra-group communication path to the intermediate servers.

3. The one or more computer storage media of claim 1, wherein the grouping of intermediate servers with a replicating server further comprises:

for each intermediate server, determining which replicating server of one or more replicating servers has a shortest intra-group path, in terms of physical distance, to each intermediate server and grouping the intermediate servers with the replicating server providing the shortest intra-group path to the intermediate servers.

4. The one or more computer storage media of claim 1, wherein the grouping of intermediate servers with a replicating server further comprises:

for each intermediate server, determining which replicating server of one or more replicating servers has a least expensive, in terms of monetary cost, intra-group communication path to each intermediate server and grouping the intermediate server with the replicating server providing the least expensive intra-group communication path to the intermediate servers.

5. The one or more computer storge media of claim 1, wherein the grouping of intermediate servers with a replicating server further comprises:

for each intermediate server, determining which replicating server of one or more replicating servers has an intra-group communication path with the largest bandwidth to each intermediate server and grouping the intermediate servers with the replicating server providing for the intra-group communication path with the largest bandwidth to the intermediate servers.

6. One or more computer storage media containing executable instructions that, when executed, implement the following steps:

creating a replication topology for a network having replicating computers and intermediary computers, wherein the replicating computers share a common data store and replicate changes to the data store to other replicating computers, by grouping each intermediary computer with the replicating computer with which it is least expensive to communicate, thereby creating one or more shortest-path trees;

determining the total cost of sending replicated changes between pairs of replicating computers via their respective shortest-path trees;

creating a replication path cost map having only replicating computers, wherein each of the pairs of replicating computers is represented as communicating by one or more direct links having a cost equal to the determined total cost;

designating the least expensive, non-redundant paths on the cost map as paths over which the replicating computers can transmit replicated changes to one another;

grouping the computers holding one or more writeable copies of a partition with each other without any intervening computers holding only one or more read-only copies of a partition;

linking the computers holding only one or more read-only copies of a partition with the computers holding one or more writeable copies of a partition; and grouping the computers holding only one or more read-only copies of a partition to replicate from one or more other computers holding only one or more read-only copies of a partition if required by the replication topology for the network.

7. The one or more computer storage media of claim 6, wherein the replicated changes are disseminated to all of the replicating computers, and wherein the intermediary computers do not incorporate the changes.

8. The one or more computer storage media of claim 6, wherein the network includes one or more bridges, the method further comprising repeating the creating a replication topology, determining, creating a replication cost map, and designating steps for each of the one or more bridges.

9. The one or more computer storage media of claim 6, wherein the network uses one or more schedules, the method further comprising repeating the creating a replication topology, determining, creating a replication cost map, and designating steps for each of the one or more schedules.

* * * * *

UNITED STATES PATENT AND TRADEMARK OFFICE
CERTIFICATE OF CORRECTION

| | | |
|---|---|---|
| PATENT NO. | : 7,499,413 B2 | Page 1 of 1 |
| APPLICATION NO. | : 11/043607 | |
| DATED | : March 3, 2009 | |
| INVENTOR(S) | : Jeffrey B. Parham et al. | |

It is certified that error appears in the above-identified patent and that said Letters Patent is hereby corrected as shown below:

In column 8, line 17, in Claim 1, after "grouping" delete "each".

In column 8, line 57, in Claim 4, delete "server" and insert -- servers --, therefor.

In column 8, line 60, in Claim 5, delete "storge" and insert -- storage --, therefor.

Signed and Sealed this
Nineteenth Day of April, 2011

David J. Kappos
*Director of the United States Patent and Trademark Office*